(12) United States Patent
Adamson et al.

(10) Patent No.: US 7,124,567 B1
(45) Date of Patent: Oct. 24, 2006

(54) KNIVES FOR A RECIPROCATING CUTTER BAR ASSEMBLY OF AN AGRICULTURAL MACHINE

(75) Inventors: James Kelley Adamson, Colona, IL (US); David Patrick Cress, Eldridge, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/193,210

(22) Filed: Jul. 29, 2005

(51) Int. Cl.
*A01D 34/13* (2006.01)

(52) U.S. Cl. .......................... 56/296; 56/298; 56/299; 56/DIG. 17

(58) Field of Classification Search .................. 56/257, 56/269, 296, 289, 298, 299, 303, DIG. 17, 56/300, 17.6, DIG. 20
See application file for complete search history.

(56) References Cited

U.S. PATENT DOCUMENTS

| 283,292 | A | * | 8/1883 | Snyder | 56/298 |
| 2,724,941 | A | * | 11/1955 | Zwiesler | 56/17.6 |
| 3,066,468 | A | * | 12/1962 | Kowalik et al. | 56/301 |
| 4,380,889 | A | * | 4/1983 | Isbell | 56/296 |
| 5,979,152 | A |   | 11/1999 | McCredie | 56/298 |

* cited by examiner

*Primary Examiner*—Thomas B. Will
*Assistant Examiner*—Alicia Torres
(74) *Attorney, Agent, or Firm*—Stephen M. Patton; Taylor & Aust, P.C.

(57) ABSTRACT

A knife section for use with a reciprocating cutter bar assembly of an agricultural machine includes a mounting base. A first knife extends outwardly from the mounting base. The first knife has a first linear extent from the mounting base. A second knife extends outwardly from the mounting base. The second knife has a second linear extent from the mounting base different than the first linear extent.

12 Claims, 4 Drawing Sheets

KNIVES FOR A RECIPROCATING CUTTER BAR ASSEMBLY OF AN AGRICULTURAL MACHINE

FIELD OF THE INVENTION

The present invention relates to agricultural machines, and, more particularly, to knives for a reciprocating cutter bar assembly of an agricultural machine.

BACKGROUND OF THE INVENTION

One type of agricultural machine is an agricultural combine. Agricultural combines are engine powered machines that harvest, thresh, separate and clean an agricultural crop.

An agricultural combine typically is equipped to accommodate a removable harvesting platform. One such harvesting platform is provided with an elongated cutter bar assembly for cutting a standing crop. The cutter bar assembly includes a steel support bar, a series of sickle guards, a knifeback, a series of knives and a series of hold-down clips. The sickle guards are mounted to the support bar. Each of the guards is provided with a channel in which the knifeback is slideably positioned. In addition, each guard is provided with a slot having ledger plates into which the knives are slideably positioned. A series of triangular knives are bolted to the knifeback. The hold-down clips are bolted to the support bar and extend forward over the knifeback into contact with the knives for holding the knives against the ledge plates of the sickle guards. The cutting edges of the knives and the ledger plates cooperate to shear the standing crop as the knifeback and the attached series of knives move in a reciprocating manner.

Farmers may rotate between varieties of crops. For example, one may follow a corn crop the next year with a no-till soybean crop. With the advent of drought resistant and herbicide tolerant corn species, however, it is possible that some of the corn stalks may still be present in the field at the time of harvesting the soybean crop. Sometimes, corn stalks and/or weed stems of large diameter will partially enter the cutter bar assembly without being cut, resulting in the plugging of the cutter bar assembly, and which in turn may result in crop loss and equipment damage.

SUMMARY OF THE INVENTION

The present invention provides a knife section, a cutter bar assembly and an agricultural machine, having knives of varying lengths to accommodate large diameter vegetation and crop residue, such as corn stalks.

The invention, in one form thereof, is directed to a knife section for use with a reciprocating cutter bar assembly of an agricultural machine. The knife section includes a mounting base. A first knife extends outwardly from the mounting base. The first knife has a first linear extent from the mounting base. A second knife extends outwardly from the mounting base. The second knife has a second linear extent from the mounting base different than the first linear extent.

The invention, in another form thereof, is directed to a cutter bar assembly for use in an agricultural machine. The cutter bar assembly has a direction of reciprocation. The cutter bar assembly includes an elongate knifeback. A plurality of knives is connected to the elongate knifeback. The plurality of knives extends outwardly from the elongate knifeback in a direction perpendicular to the direction of reciprocation. The plurality of knives includes a first subset of knives having a first linear extent, and a second subset of knives having a second linear extent different than the first linear extent.

The invention, in another form thereof, is directed to an agricultural machine. The agricultural machine includes a supporting structure. A harvesting platform is coupled to the supporting structure. The harvesting platform is equipped with a cutter bar assembly. The cutter bar assembly has a direction of reciprocation. The cutter bar assembly includes an elongate knifeback. A plurality of knives is connected to the elongate knifeback. The plurality of knives extends outwardly from the elongate knifeback in a direction perpendicular to the direction of reciprocation. The plurality of knives includes a first subset of knives having a first linear extent, and a second subset of knives having a second linear extent different than the first linear extent.

DETAILED DESCRIPTION OF THE INVENTION

Figure 1:
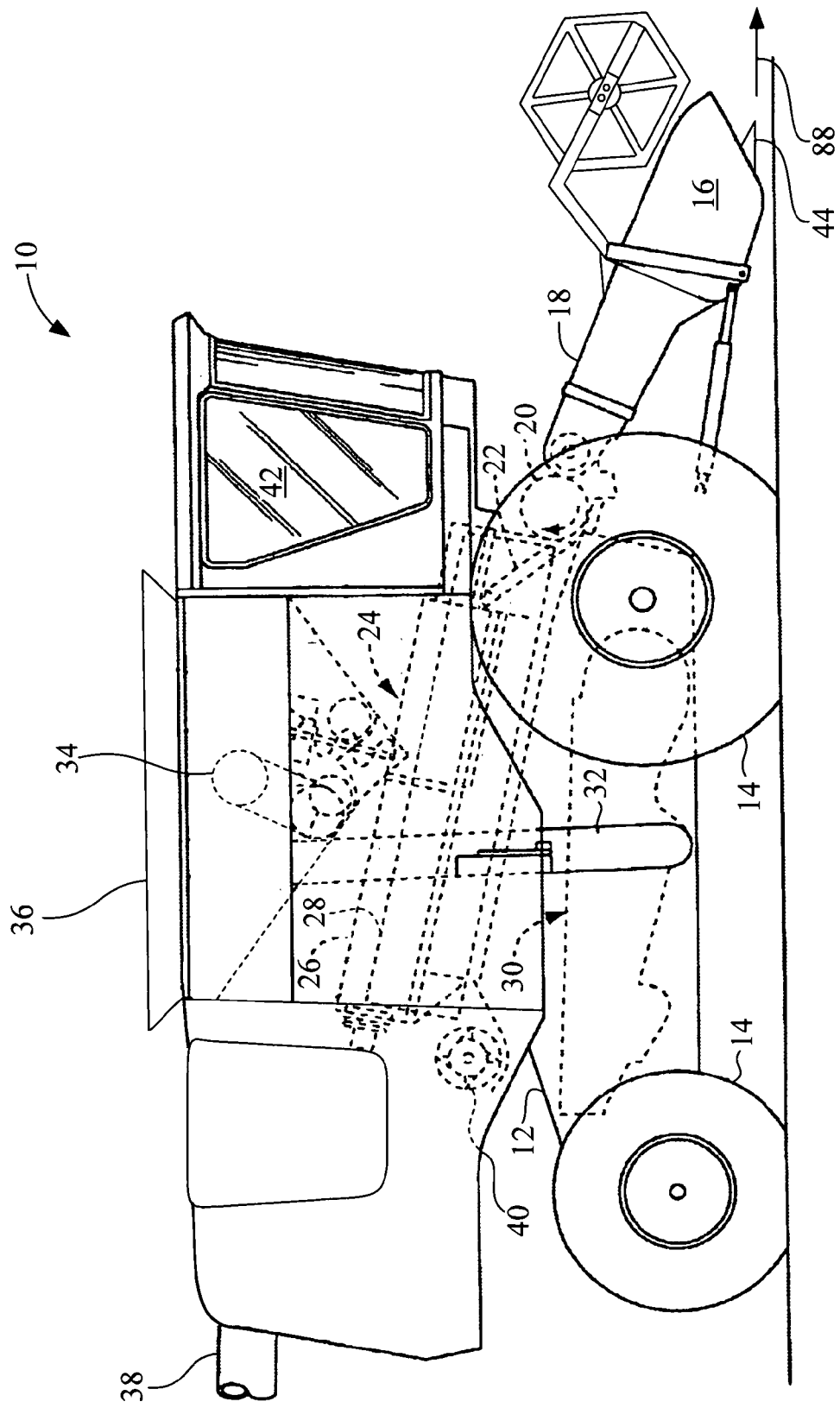
FIG. 1 is a diagrammatic side view of an agricultural machine, and in particular an agricultural combine, embodying the present invention.

FIG. 1 is a diagrammatic depiction of an agricultural machine 10. In the embodiment shown, agricultural machine 10 is in the form of an agricultural combine. Although the invention is being described as being incorporated into a combine, it is contemplated that the present invention may be used with other types of agricultural machines.

Agricultural machine 10, in the form of a combine, includes a supporting structure 12. A propulsion unit 14, which may include tires and/or tracks that engage the ground, is coupled to supporting structure 12, and performs propulsion and/or steering functions. A harvesting platform 16 is removably coupled to supporting structure 12, and is used for harvesting a crop and directing the crop to a feederhouse 18. The harvested crop is directed by feederhouse 18 to a beater 20. Beater 20 directs the harvested crop upwardly through an inlet transition section 22 to an axial crop processing unit 24.

Axial crop processing unit 24 is located between, and supported by the side sheets of agricultural machine 10. Axial crop processing unit 24 includes an axial rotor housing 26 and an axial rotor 28 located in axial rotor housing 26. The harvested crop enters axial rotor housing 26 through inlet transition section 22. Axial rotor 28 is provided with an infeed portion, a threshing portion and a separating portion. Axial rotor housing 26 has a corresponding infeed section, a threshing section and a separating section.

Both crop processing portions, the threshing portion and the separating portion, are provided with crop engaging assemblies. The threshing section of the axial rotor housing 26 is provided with a concave and the separating section is provided with a grate. Grain and chaff released from the crop mat falls through the concave and the grate. The concave and grate prevent the passage of crop material larger than grain or chaff from entering a cleaning system 30.

Grain and chaff falling through the concave and grate is directed to cleaning system 30 which removes the chaff from the grain. The clean grain is then directed by a clean grain elevator 32 to a fountain auger 34. Fountain auger 34 directs the grain into a grain tank, or grain compartment, 36. The grain is removed from the grain tank 36 by an unloading auger 38.

As the crop residue, e.g., straw, stalks, chaff, dust, etc., reaches the end of the crop processing unit it is expelled through an outlet to a beater 40. Beater 40 propels the crop residue out the rear of the combine. The operation of agricultural machine 10 is controlled from the operator's cab 42.

As shown in FIG. 1, harvesting platform 16 includes a reciprocating cutter bar assembly 44 for cutting a standing crop, such as for example, soybeans, wheat, etc. A discussion of two embodiments of cutter bar assembly 44 follows below. The embodiment shown in FIG. 2 will be referenced as cutter bar assembly 44a. The embodiment shown in FIG. 3 will be referenced as cutter bar assembly 44b. FIG. 4 is a double knife section 48 configured in accordance with the present invention, and is used in each of the embodiments of FIGS. 2 and 3.

Referring now to FIG. 4, double knife section 48 is designed to cut in a direction of reciprocation 50. In the embodiment of FIG. 4, double knife section 48 is formed as a planar unitary part that includes a mounting base 52 from which a first triangle-shaped knife 54 and a second triangle-shaped knife 56 outwardly extend. In the embodiment shown, first triangle-shaped knife 54 has a pair of serrated cutting edges 58, and second triangle-shaped knife 56 has a pair of serrated cutting edges 60.

First triangle-shaped knife 54 and second triangle-shaped knife 56 join mounting base 52 at a location represented by a dashed baseline 62 representing an imaginary edge of mounting base 52, and from which the respective lengths of first knife 54 and second knife 56 may be measured. First triangle-shaped knife 54 has a tip end 64, and second triangle-shaped knife 56 has a tip end 66. A centerline 68 of first triangle-shaped knife 54 passing through tip end 64 and a centerline 70 of second triangle-shaped knife 56 passing through tip end 66 are separated by a distance D in the direction of reciprocation 50. Distance D may be determined, for example, based in part upon the crop application. In one embodiment, for example, distance D may be about two inches for a soybean crop application.

First triangle-shaped knife 54 has a length L1 measured from baseline 62 to tip end 64 in a direction perpendicular to the direction of reciprocation 50. Accordingly, length L1 defines the linear extent of first triangle-shaped knife 54. Second triangle-shaped knife 56 has a length L2 measured from baseline 62 to tip end 66 in a direction perpendicular to the direction of reciprocation 50. Accordingly, length L2 defines the linear extent of second triangle-shaped knife 56.

In accordance with the present invention, the length, i.e., linear extent, L2 of second triangle-shaped knife 56 is shorter than the length, i.e., linear extent, L1 of first triangle-shaped knife 54. Thus, first triangle-shaped knife 54 includes an end portion 72 extending beyond a portion 74, wherein portion 74 of first triangle-shaped knife 54 corresponds to the length L2 of second triangle-shaped knife 56 and end portion 72 is the part of first triangle-shaped knife 54 that extends beyond the length of second triangle-shaped knife 56 by a distance of (L1–L2). The linear extent L2 of second triangle-shaped knife 56 may be, for example, about 50 to 75 percent of the length of first triangle-shaped knife 54. In the embodiment of double knife section 48 shown in FIG. 4, which may be used, for example, in harvesting soybeans with corn stalks and/or large weed stems present, linear extent L2 of second triangle-shaped knife 56 is about 66 percent (⅔) of the length of first triangle-shaped knife 54.

Figure 2:
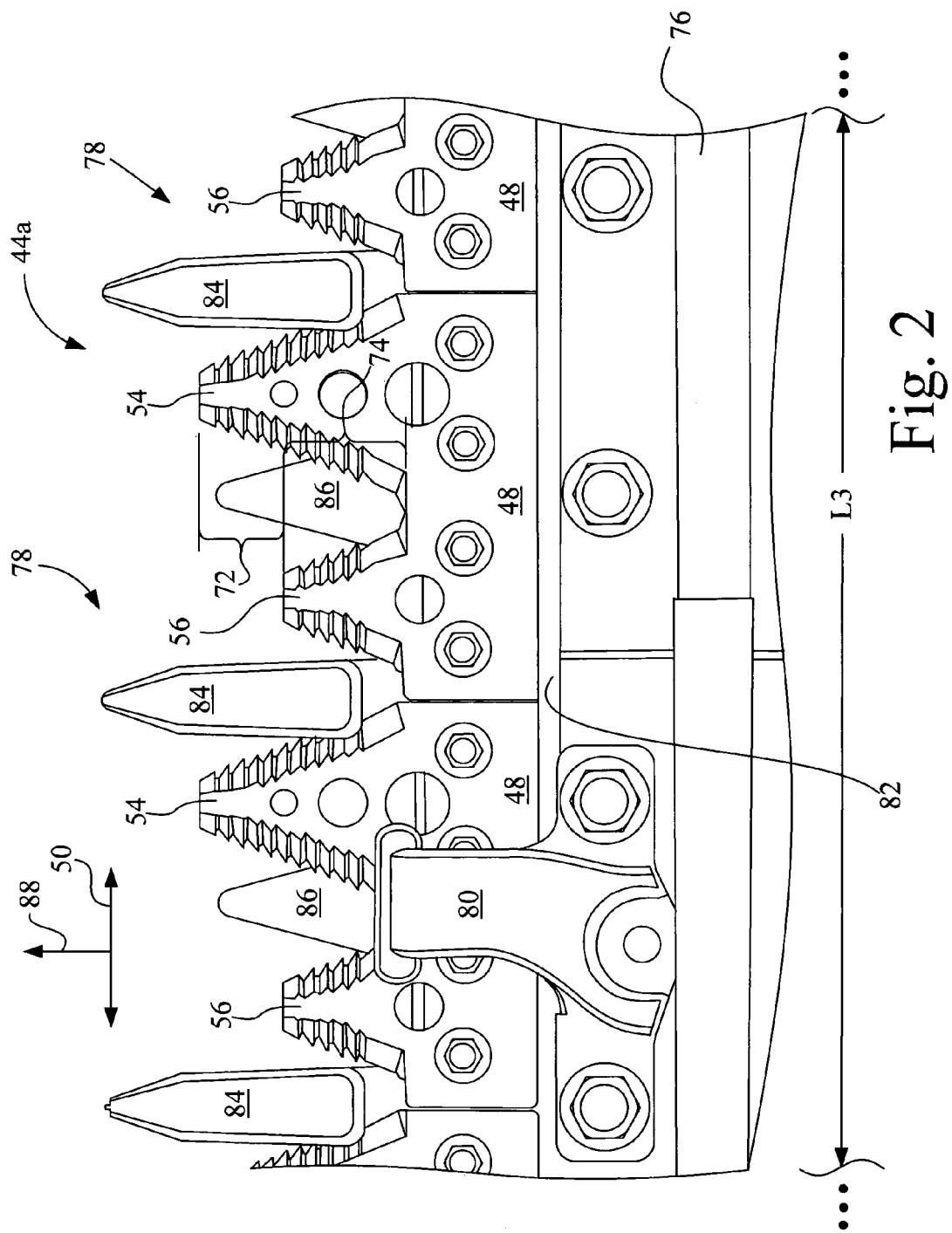
FIG. 2 is a top view of a portion of the cutter bar assembly of FIG. 1, according to one embodiment of the present invention.

Referring to FIG. 2, there is shown a portion of cutter bar assembly 44a. Cutter bar assembly 44a includes a non-reciprocating support bar 76 to which is mounted a plurality of sickle guard sections 78 and a plurality of hold-down clips 80. A reciprocating elongate knifeback 82 is slideably positioned in a channel (not shown) formed in each of the plurality of sickle guard sections 78. Support bar 76 and the knifeback 82 extend in the direction of reciprocation 50, which is transverse to a forward travel direction 88 of agricultural machine 10.

Knifeback 82 is provided with a series of mounting holes to which a plurality of knife sections, such as double knife sections 48, are attached by fasteners, such as for example, by bolts or rivets. The plurality of knife sections 48 extend outwardly from elongate knifeback 82 in a direction perpendicular to the direction of reciprocation 50. The plurality of knife sections 48 include a first subset of knives 54 having a first linear extent in a horizontal plane from support bar 76, and a second subset of knives 56 having a second linear extent in the horizontal plane from support bar 76 different than, e.g., shorter than, the first linear extent from support bar 76 of the first subset of knives 54. The first subset of knives 54 and the second subset of knives 56 are interleaved along knifeback 82 in the direction of reciprocation 50, and alternate in length, e.g., L1, L2, L1, L2 . . . , in a direction perpendicular to the direction of reciprocation 50.

Each of the plurality of sickle guard sections 78 includes a long guard point 84 and a short guard point 86. In the embodiment of FIG. 2, each long guard point 84 has an extent from support bar 76 in a horizontal plane of support bar 76 that is longer than the corresponding extents of the first subset of knives 54 and the second subset of knives 56 from support bar 76. Also, each short guard point 86 has an extent from support bar 76 in the horizontal plane of support bar 76 that is shorter than the corresponding extent of the first subset of knives 54 from support bar 76 and longer than the corresponding extent of the second subset of knives 56 from support bar 76. The plurality of long guard points 84 and the plurality of short guard points 86 are interleaved in an alternating fashion, e.g., long, short, long, short, . . . , along the length L3 of support bar 76

Figure 3:
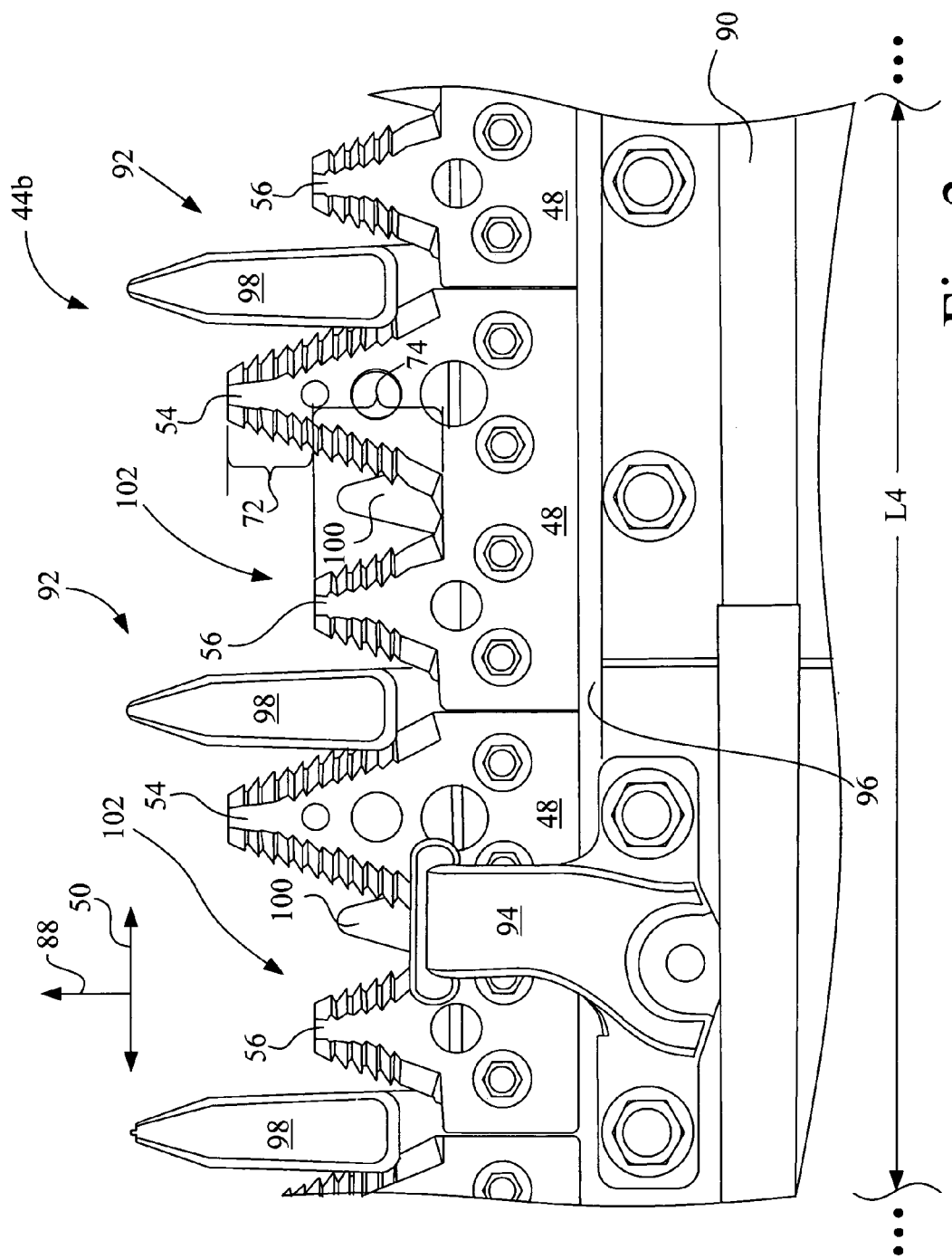
FIG. 3 is a top view of a portion of the cutter bar assembly of FIG. 1, according to another embodiment of the present invention.
Figure 4:
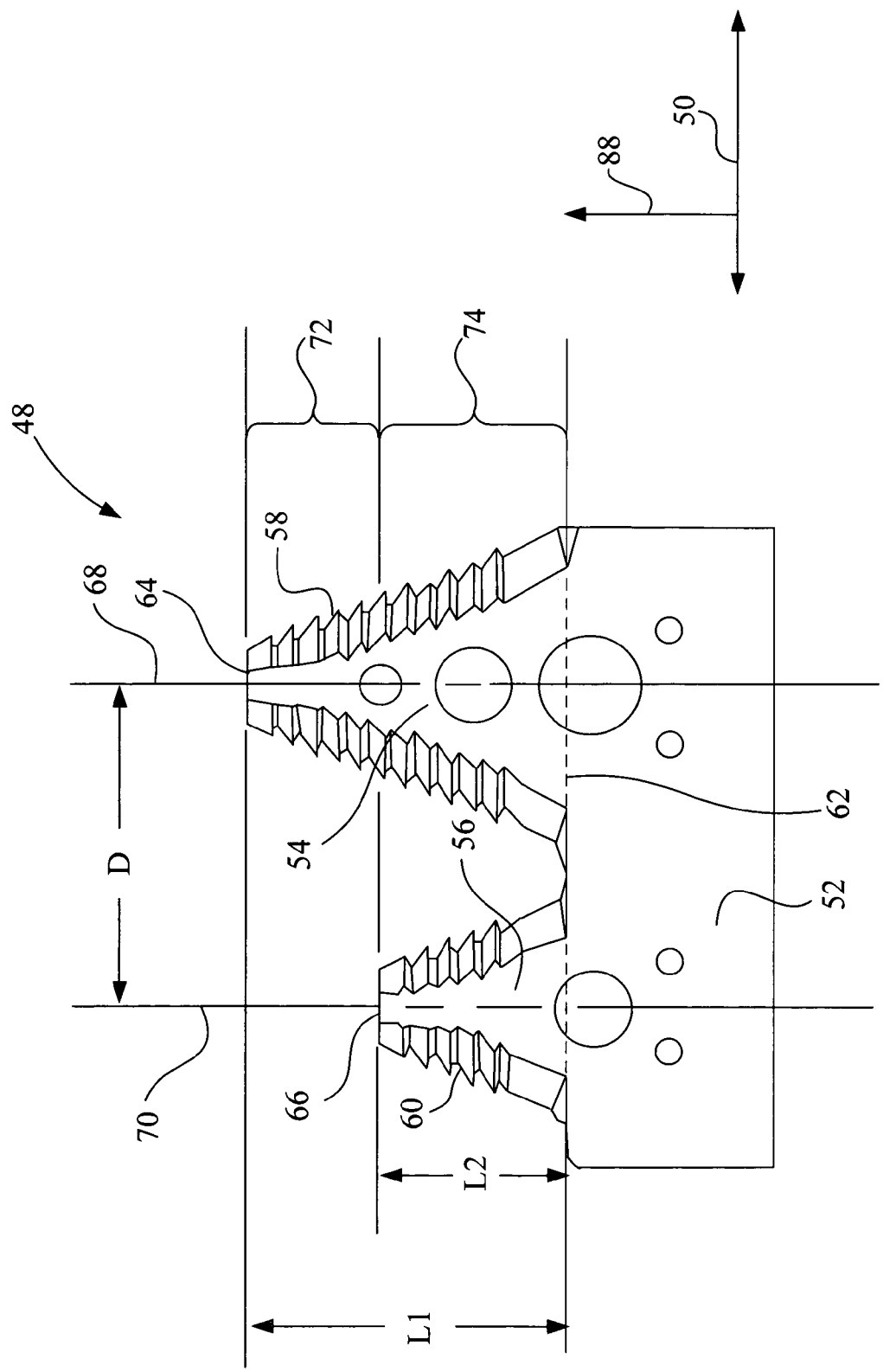
FIG. 4 is a double knife section configured in accordance with the present invention, and may be used in each of the embodiments of FIGS. 2 and 3.

Referring to FIG. 3, there is shown a portion of cutter bar assembly 44b. Cutter bar assembly 44b includes a non-reciprocating support bar 90 to which is mounted a plurality of sickle guard sections 92 and a plurality of hold-down clips 94. A reciprocating elongate knifeback 96 is slideably positioned in a channel (not shown) formed in each of the plurality of sickle guard sections 92. Support bar 90 and the knifeback 96 extend in the direction of reciprocation 50, which is transverse to a forward travel direction 88 of agricultural machine 10.

Knifeback 96 is provided with a series of mounting holes to which a plurality of knife sections, such as double knife sections 48, are attached by fasteners, such as for example, by bolts or rivets. The plurality of knife sections 48 extend outwardly from elongate knifeback 96 in a direction perpendicular to the direction of reciprocation 50. The plurality of knife sections 48 include a first subset of knives 54 having a first linear extent in a horizontal plane from support bar 90, and a second subset of knives 56 having a second linear extent in the horizontal plane from support bar 90 different than, e.g., shorter than, the first linear extent from support bar 90 of the first subset of knives 54. The first subset of knives 54 and the second subset of knives 56 are interleaved along knifeback 96 in the direction of reciprocation 50, and alternate in length, e.g., L1, L2, L1, L2 . . . , in a direction perpendicular to the direction of reciprocation 50.

Each of the plurality of sickle guard sections 92 includes a long guard point 98 and a short guard point 100. In the embodiment of FIG. 3, each long guard point 98 has an extent from support bar 90 in a horizontal plane of support bar 90 that is longer than the corresponding extents of the first subset of knives 54 and the second subset of knives 56 from support bar 90. Also, each short guard point 100 has an extent from support bar 90 in the horizontal plane of support bar 90 that is shorter than the corresponding extents of both the first subset of knives 54 and the second subset of knives 56 from support bar 90. The plurality of long guard points 98 and the plurality of short guard points 100 are interleaved in an alternating fashion, e.g., long, short, long, short, . . . , along the length L4 of support bar 90.

In the embodiments of FIGS. 2 and 3, with reference to FIG. 4, when double knife section 48 is reciprocated in the direction of reciprocation 50, the end portion 72 of first triangle-shaped knife 54 of double knife section 48 will pre-cut (i.e., single cut) crop material at a frequency of one-half that of a combination of portion 74 of first triangle-shaped knife 54 and second triangle-shaped knife 56 (i.e., double cut). As such, as is particularly evident in the embodiment of FIG. 3, a cavity 102 is formed with respect to each double knife section 48 having a shorter knife 56 in relation to the length of a longer knife 54 to receive larger diameter crop material and vegetation, such as corn stalks, that otherwise may not be accommodated by prior cutter bars wherein all of the knives have the same length.

Having described preferred embodiments, it will become apparent that various modifications can be made without departing from the scope of the invention as defined in the accompanying claims.

The invention claimed is:

1. A cutter bar assembly for use in an agricultural machine, said cutter bar assembly having a direction of reciprocation, comprising:
an elongate knifeback; and
a plurality of knives connected to said elongate knifeback, said plurality of knives extending outwardly from said elongate knifeback in a direction perpendicular to said direction of reciprocation, said plurality of knives including:
a first subset of knives having a first linear extent, each knife of said first subset of knives having a first pair of cutting edges of substantially equal length, and
a second subset of knives having a second linear extent different than said first linear extent, each knife of said second subset of knives having a second pair of cutting edges of substantially equal length.

2. The cutter bar assembly of claim 1, wherein said second subset of knives are shorter than said first subset of knives.

3. The cutter bar assembly of claim 2, wherein said second linear extent is in a range of about 50 to 75 percent of said first linear extent.

4. A cutter bar assembly for use in an agricultural machine, said cutter bar assembly having a direction of reciprocation, comprising:
an elongate knifeback; and
a plurality of knives connected to said elongate knifeback, said plurality of knives extending outwardly from said elongate knifeback in a direction perpendicular to said direction of reciprocation, said plurality of knives including a first subset of knives having a first linear extent, and a second subset of knives having a second linear extent different than said first linear extent,
wherein said first subset of knives and said second subset of knives are interleaved in said direction of reciprocation and alternate in length in a direction perpendicular to said direction of reciprocation.

5. A cutter bar assembly for use in an agricultural machine, said cutter bar assembly having a direction of reciprocation, comprising:
an elongate knifeback;
a plurality of knives connected to said elongate knifeback, said plurality of knives extending outwardly from said elongate knifeback in a direction perpendicular to said direction of reciprocation, said plurality of knives including a first subset of knives having a first linear extent, and a second subset of knives having a second linear extent different than said first linear extent;
a support bar configured to receive said elongate knifeback; and
a plurality of sickle guards attached to said support bar, said plurality of sickle guards including a plurality of long guard points interleaved in an alternating fashion with a plurality of short guard points,
each of said plurality of short guard points having an extent from said support bar that is shorter than a corresponding extent of first subset of knives from said support bar and longer than a corresponding extent of said second subset of knives from said support bar.

6. A cutter bar assembly for use in an agricultural machine, said cutter bar assembly having a direction of reciprocation, comprising:
an elongate knifeback;
a plurality of knives connected to said elongate knifeback, said plurality of knives extending outwardly from said elongate knifeback in a direction perpendicular to said direction of reciprocation, said plurality of knives including a first subset of knives having a first linear extent, and a second subset of knives having a second linear extent different than said first linear extent;
a support bar configured to receive said elongate knifeback; and
a plurality of sickle guards attached to said support bar, said plurality of sickle guards including a plurality of long guard points interleaved in an alternating fashion with a plurality of short guard points,
each of said plurality of short guard points having an extent from said support bar that is shorter than a corresponding extent of first subset of knives from said support bar and shorter than a corresponding extent of said second subset of knives from said support bar.

7. An agricultural machine, comprising:
a supporting structure; and
a harvesting platform coupled to said supporting structure, said harvesting platform being equipped with a cutter bar assembly, said cutter bar assembly having a direction of reciprocation, said cutter bar assembly including:
an elongate knifeback; and
a plurality of knives connected to said elongate knifeback, said plurality of knives extending outwardly from said elongate knifeback in a direction perpendicular to said direction of reciprocation, said plurality of knives including:

a first subset of knives having a first linear extent, each knife of said first subset of knives having a first pair of cutting edges of substantially equal length, and a second subset of knives having a second linear extent different than said first linear extent, each knife of said second subset of knives having a second pair of cutting edges of substantially equal length.

8. The agricultural machine of claim 7, wherein said second subset of knives are shorter than said first subset of knives.

9. The agricultural machine of claim 8, wherein said second linear extent is in a range of about 50 to 75 percent of said first linear extent.

10. An agricultural machine, comprising:
a supporting structure; and
a harvesting platform coupled to said supporting structure, said harvesting platform being equipped with a cutter bar assembly, said cutter bar assembly having a direction of reciprocation, said cutter bar assembly including:
an elongate knifeback; and
a plurality of knives connected to said elongate knifeback, said plurality of knives extending outwardly from said elongate knifeback in a direction perpendicular to said direction of reciprocation, said plurality of knives including a first subset of knives having a first linear extent, and a second subset of knives having a second linear extent different than said first linear extent,
wherein said first subset of knives and said second subset of knives are interleaved in said direction of reciprocation and alternate in length in a direction perpendicular to said direction of reciprocation.

11. An agricultural machine, comprising:
a supporting structure; and
a harvesting platform coupled to said supporting structure, said harvesting platform being equipped with a cutter bar assembly, said cutter bar assembly having a direction of reciprocation, said cutter bar assembly including:
an elongate knifeback;
a plurality of knives connected to said elongate knifeback, said plurality of knives extending outwardly from said elongate knifeback in a direction perpendicular to said direction of reciprocation, said plurality of knives including a first subset of knives having a first linear extent, and a second subset of knives having a second linear extent different than said first linear extent;
a support bar configured to receive said elongate knifeback; and
a plurality of sickle guards attached to said support bar, said plurality of sickle guards including a plurality of long guard points interleaved in an alternating fashion with a plurality of short guard points,
each of said plurality of short guard points having an extent from said support bar that is shorter than a corresponding extent of first subset of knives from said support bar and longer than a corresponding extent of said second subset of knives from said support bar.

12. An agricultural machine, comprising:
a supporting structure; and
a harvesting platform coupled to said supporting structure, said harvesting platform being equipped with a cutter bar assembly, said cutter bar assembly having a direction of reciprocation, said cutter bar assembly including:
an elongate knifeback;
a plurality of knives connected to said elongate knifeback, said plurality of knives extending outwardly from said elongate knifeback in a direction perpendicular to said direction of reciprocation, said plurality of knives including a first subset of knives having a first linear extent, and a second subset of knives having a second linear extent different than said first linear extent;
a support bar configured to receive said elongate knifeback; and
a plurality of sickle guards attached to said support bar, said plurality of sickle guards including a plurality of long guard points interleaved in an alternating fashion with a plurality of short guard points,
each of said plurality of short guard points having an extent from said support bar that is shorter than a corresponding extent of first subset of knives from said support bar and shorter than a corresponding extent of said second subset of knives from said support bar.

* * * * *